July 2, 1968 N. P. IVANOVIC 3,390,573
MICRO CREEP-TESTING
Filed Oct. 20, 1965 6 Sheets-Sheet 1
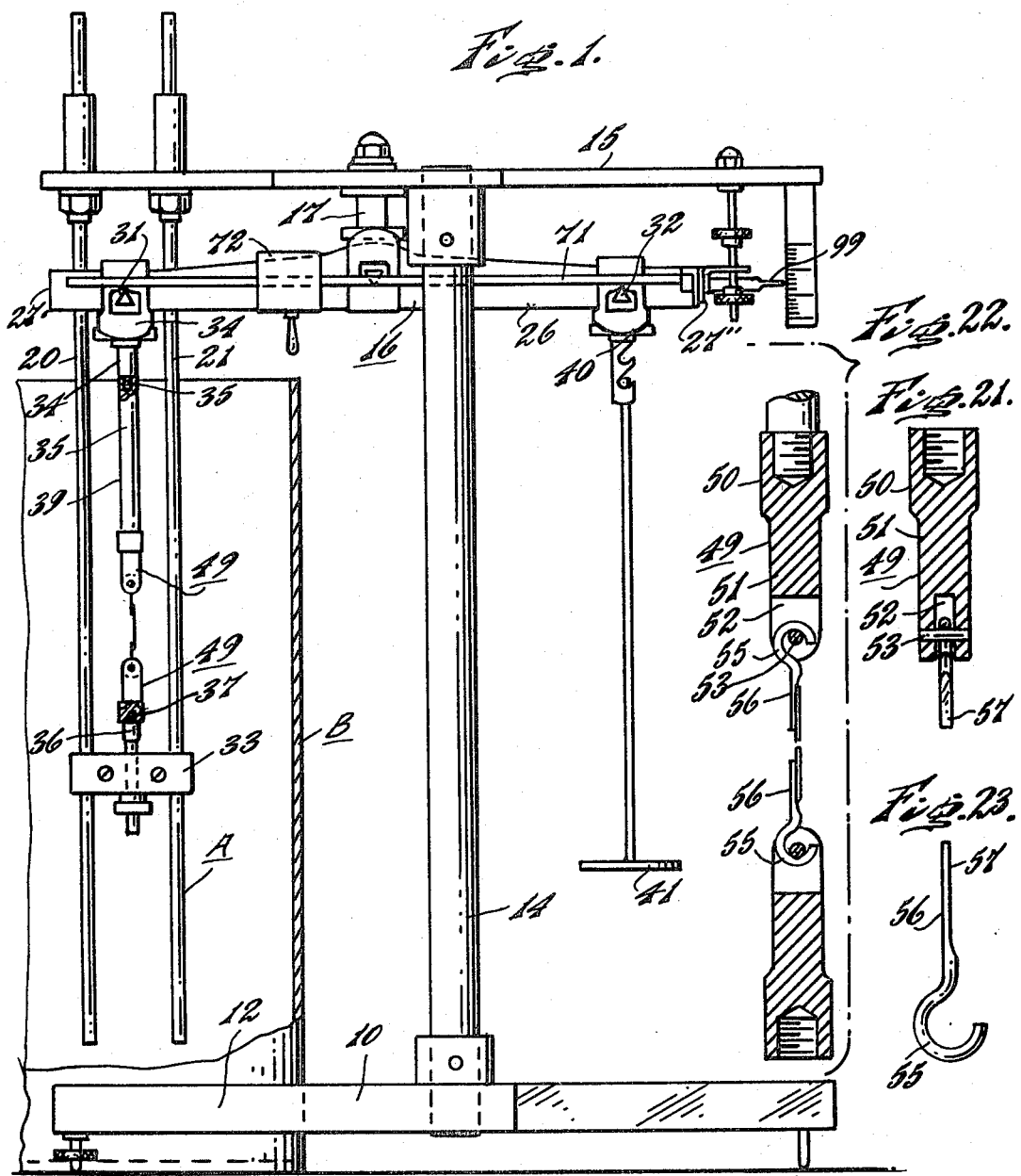
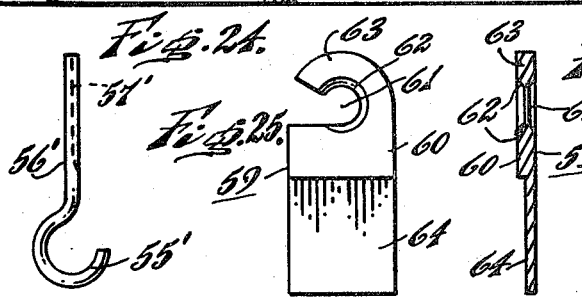
INVENTOR.
Nicholas P. Ivanovic
BY Frank H. Borden
ATTORNEY

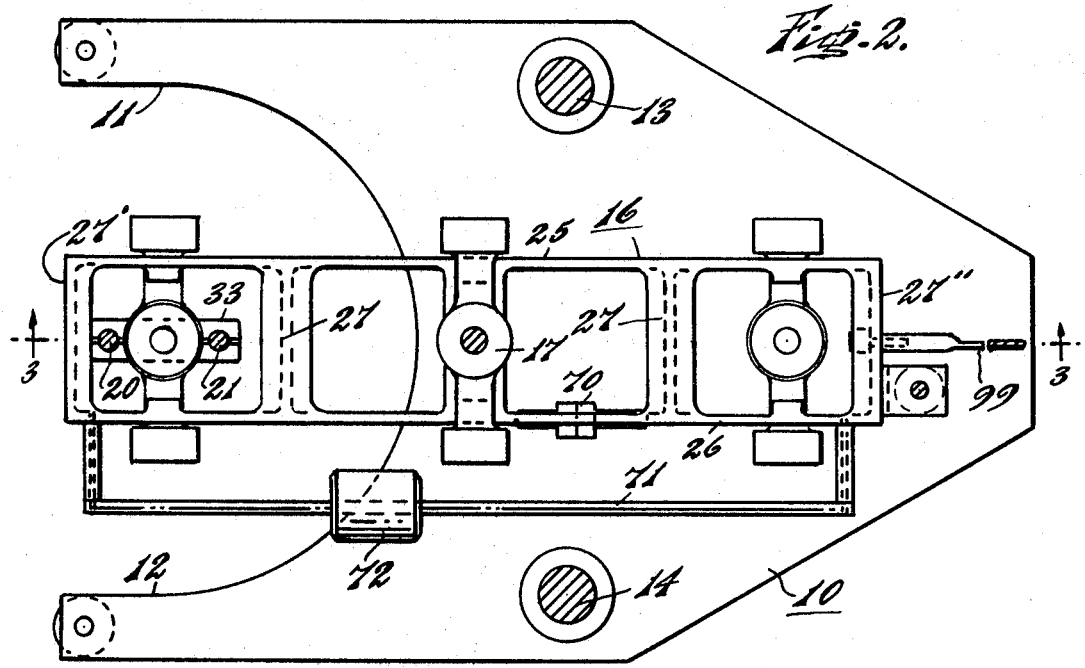
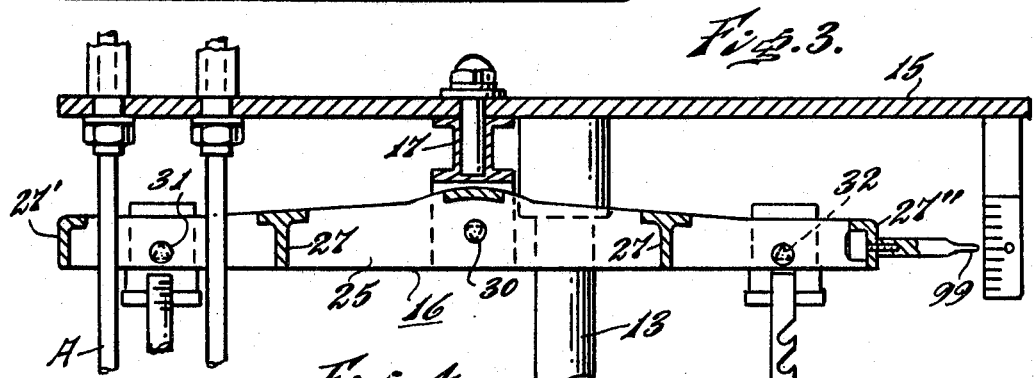
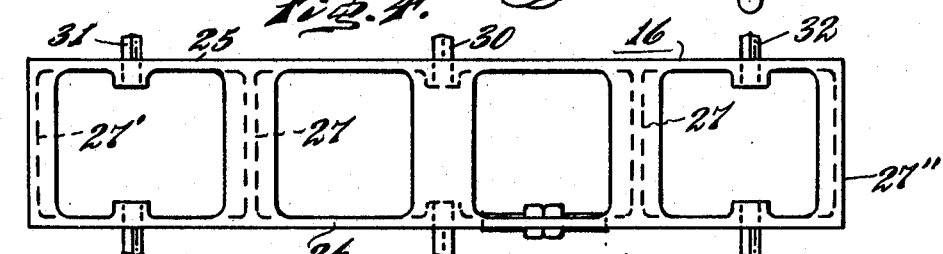
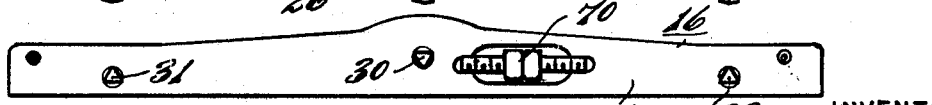

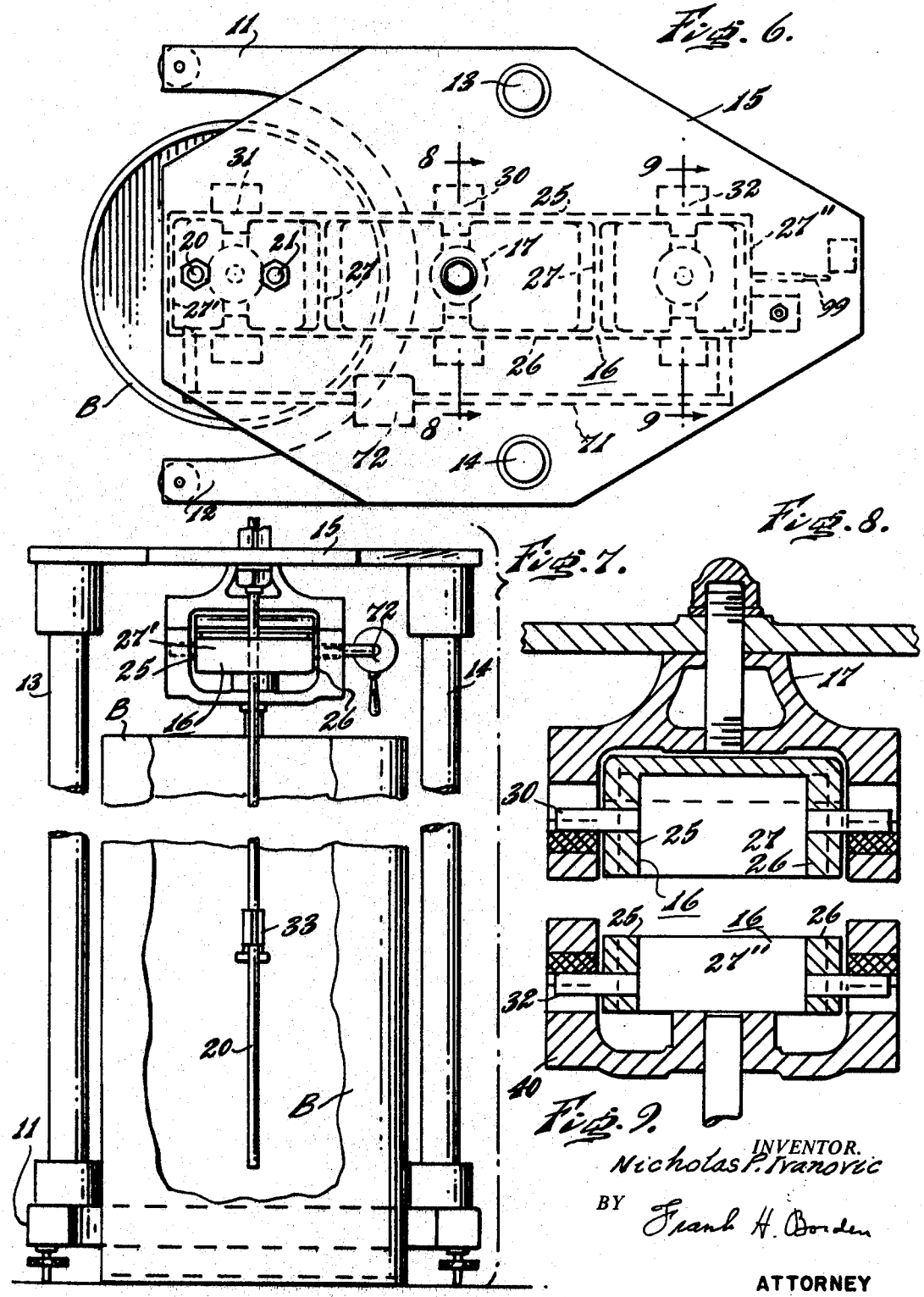

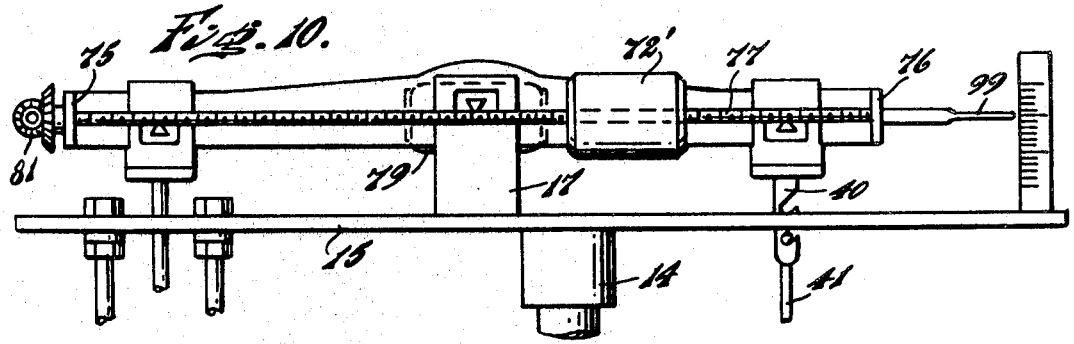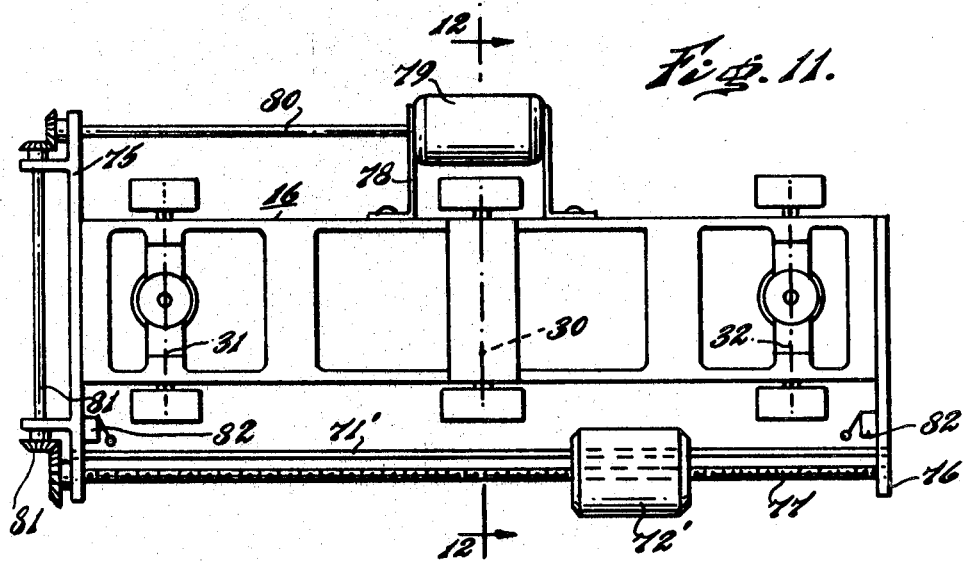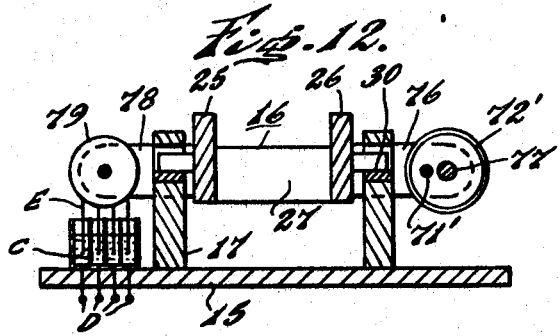

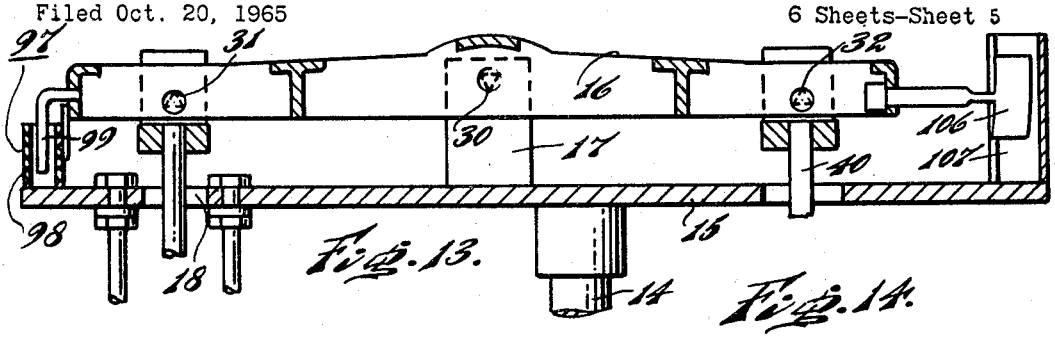
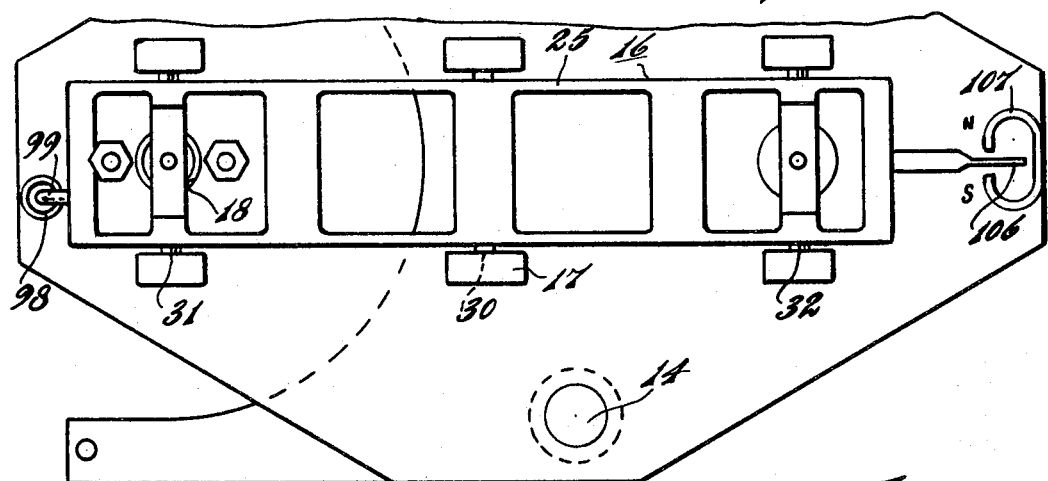
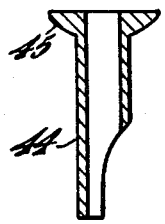
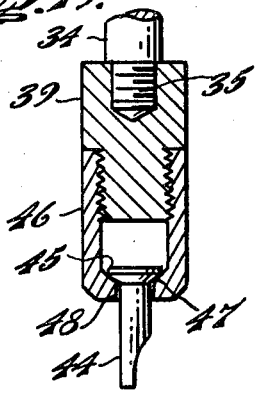
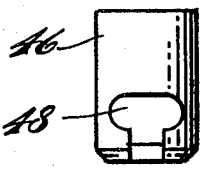
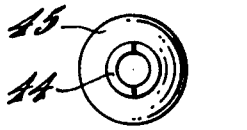

_United States Patent Office_  
3,390,573  
Patented July 2, 1968

1

3,390,573  
MICRO CREEP-TESTING  
Nicholas P. Ivanovic, Brielle, N.J., assignor to Thwing Albert Instrument Co., Inc., Philadelphia, Pa., a corporation of Pennsylvania  
Filed Oct. 20, 1965, Ser. No. 498,950  
2 Claims. (Cl. 73—95)

ABSTRACT OF THE DISCLOSURE

Apparatus for creep-testing of small specimens such as flat sheets or foils, whiskers, fibers, crystals and filaments, in a predetermined controlled environment. Visual observation is available as well as a controlled servo unit with a read out of elongation or to provide load changes or constant strain in the specimen. Simple and economical specimen mountings are shown.

This invention relates to micro creep-testing and to apparatus effecting same.

Creep-testing relates to the measured deformation of a specimen test piece under a continuous strain or a series of intermittent loads or strains during a predetermined time interval. Usually the test is of elongation under tensile loads, although it also may in a broad sense, as well be of compression under compressive loads. Creep-testing per se developed in the prior art, but, in the main, the apparatus is large and heavy and highly expensive, and is directed to testing of test specimens of large size, usually under ambient environmental conditions. A typical prior art situation was the creep-testing of a metal piece of, say, ½ inch diameter subjected to perhaps tons of loading for periods of months or even years. Such testing requires for multiple specimens, batteries of huge and expensive machines covering large floor areas and of such prohibitive expense that only the largest of organizations could afford same, and could not be used for whisker-sized specimens.

With advances in technology many new materials have evolved or been created which assume the form of minute "micro" specimens which cannot be tested by the existing machines, but which it is essential be creep-tested and especially that the creep-testing be accomplished with the specimen in a specific predetermined environment, other than merely ambient.

These specimens, designated as "micro," "minute," "miniature" or "sub-miniature," take the form of flat sheets or foils, whiskers, fibres, crystals and filaments, of both regular and irregular cross-section and of extremely small section, of the order of thousandths of an inch. Creep tests utilizing these minute specimens, especially in a controlled environment, have already caused startling discoveries as to the basic properties of many materials, which have brought into being new and improved products. More, as an important incident and object of the present invention, usable results have been attained in minute time intervals as contrasted with those necessary for large specimen-prior art creep-testing.

It is among the objects of this invention: to provide a low-cost, small, portable, creep-testing apparatus for micro specimens, of universal application and use; to provide creep-testing apparatus of such small size and economy as to be usable in schools, laboratories and shops, or the like, with efficiency and accuracy, for testing miniature and sub-miniature specimens; to provide a creep-testing apparatus by which the specimen can be surrounded by a predetermined controlled environment other than ambient, with efficiency and high economy; to provide such an instrument with means for visual observation

2 of response to strain; to provide such an instrument with a read-out of deflection of the beam; to utilize in such an instrument an electrical element to sense deflection and control a servo unit, the output of which is used to provide read-out of elongation, or to provide changes in load or in the elevation of the beam relative to the anchorage of the specimen, so as to maintain a state of constant strain in the specimen; to improve the means for easy and economical mounting of specimens for anchored engagement to the grips of the apparatus; and many other objects and advantages will become apparatus as the description proceeds.

In the accompanying drawings, forming part of this description:

FIGURE 1 represents a partially fragmentary side elevation of the invention according to one embodiment, showing the relationship of the beam supporting the free end of a specimen and of the probe anchoring the other end of the specimen in an illustrative environmental-determining container or housing.

FIGURE 2 represents a horizontal section taken below the platform of FIGURE 1 showing the beam and base in fragmentary plan.

FIGURE 3 represents a vertical fragmetnary section through the apparatus taken on line 3—3 of FIGURE 2.

FIGURE 4 represents a plan of the illustrative beam of the invention, showing the pivotal knife edges on a rigid cantilever unit.

FIGURE 5 represents a side elevation of the beam of FIGURE 4, disclosing the static balancing elements of the beam in greater detail than in FIGURE 2 or 4.

Figure 15:
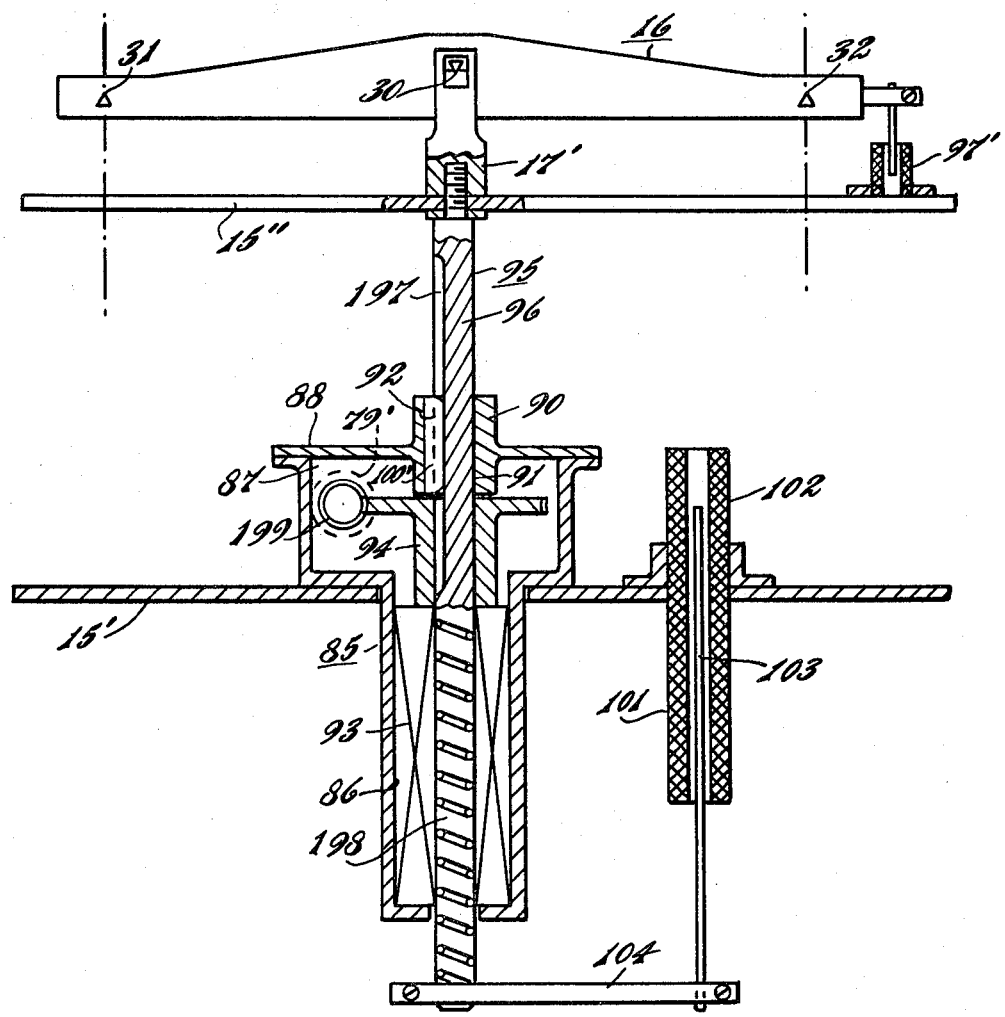

FIGURE 6 repreesnts a top plan of the device illustrated in FIGURE 1 also illustrating the container for the controlled environment surrounding the test specimen.

FIGURE 7 represents a fragmentary side elevation of the organization of the preceding figures as seen from the left of FIGURE 1.

FIGURE 8 represents a fragmentary detail of the beam-pivoting pedestal yoke support mounted on the platform of the tester, taken on line 8—8 of FIGURE 6.

FIGURE 9 represents a fragmentary detail of the beam-end mounted pivotal yoke suspension, as taken, for instance, on line 9—9 of FIGURE 6.

FIGURE 10 represents an illustrative modification of the organization previously described showing in fragmentary elevation the beam mounted above its platform, and a servo motor and associated gearing responsive to a transducer output for adjusting a weight longitudinally of the beam as a function of tilt thereof.

FIGURE 11 represents a plan of the device of FIGURE 10 with some parts omitted, for clarity.

FIGURE 12 represents a fragmentary diagrammatic section of the device of FIGURE 10 taken on line 12—12 thereof, showing the servo motor and driven connections.

FIGURE 13 represents a fragmentary vertical section through the upper end of an organization with the beam pivoted above the platform, showing the transducer at one end of the beam for clarity only, and a magnetic beam oscillation damper at the other end of said beam.

FIGURE 14 represents a fragmentary plan of the device of FIGURE 13.

FIGURE 15 represents a fragmentary side elevation of a modification of the organization of FIGURE 13 showing a vertically adjusted pivot for the beam mounted on a vertically adjusted sub-platform to change the vertical relationship of the beam and sub-platform to the fixed platform, and a common servo motor actuated by tilting of the beam and energization of a transducer for vertically adjusting the beam and sub-platform, as well as a separate transducer signalling the elongation of the specimen.

FIGURE 16 represents a side elevation of a form of tubular specimen mount, for attachment to a grip of the system, such as shown in FIGURES 17 and 19.

FIGURE 17 represents an end elevation of the mount of FIGURE 16.

FIGURE 18 represents a side elevation of the grip for attachment to the beam or probe components to receive and temporarily support the mount shown in FIGURES 16 and 17.

FIGURE 19 represents a longitudinal section through the grip of FIGURE 18, engaged by a mount, shown in FIGURE 16.

FIGURE 20 represents an end elevation of the grip of FIGURE 18.

FIGURE 21 represents a longitudinal section through a modified grip for the system, in one plane, supporting an illustrative mount for a specimen.

FIGURE 22 represents a longitudinal section through the form shown in FIGURE 1, in a different plane from the action of FIGURE 21, for the reception of various forms of hooked specimen mounts shown in succeeding figures, with an illustrative specimen mounted thereto, and to a complemental anchored specimen mount below.

FIGURE 23 represents a side elevation of a modified form of specimen mount for removable association with a grip such as shown in FIGURE 22, having a narrow planar mounting surface.

FIGURE 24 represents a side elevation of a modified form of the mount of FIGURES 21 and 22 having a longitudinal groove as the specimen mounting surface.

FIGURE 25 represents a plan of a still further modified form of mount having a wide planar surface for the mounted reception of foils and the like.

FIGURE 26 represents a longitudinal section through the mount of FIGURE 25.

In carrying out the invention in an illustrative form a horizontal platform is mounted on supports in parallel spaced relation to a base shaped to removably receive an environment-control housing unit having, initially at least, an open upper end. The platform mounts a pair of closely grouped parallel depending vertical rods forming a free-ended probe, spaced vertically from the base, so as to permit axial insertion into an environment-control housing unit. The free-ended probe, towards its lower end rigidly mounts a lower anchored grip for the test specimen. A generally horizontal beam is pivoted to the platform on a horizontal axis for limited oscillation and at one end pivotally mounts a weight support. At the other end the beam pivotally mounts a weight support. At the other end the beam pivotally mounts a free end grip, extending toward the lower anchored grip, so that with a specimen connected between the respective grips on grip mounts it is surrounded by the instant environment-control unit. The beam mounts or controls an indicator of deflection from datum which may be visual or electronic or both. Preferably the oscillations of the beam are damped by a magnetic damper.

An illustrative organization is shown in the drawings and comprises a base 10, having spaced horizontal legs 11 and 12. Conventional leveling devices may be associated with the base. A pair of rigid vertical posts 13 and 14 are mounted on the base, and at the upper ends rigidly mount the horizontal platform 15. A rigid beam 16 is pivotally mounted on the platform 15 by means of a pedestal yoke 17. The beam may be pivotally mounted below the platform if desired, as shown in FIGURES 1-9 inclusive, but mounting above the platform is preferred, as shown in FIGURE 10, etc., in order to accommodate specimens that exhibit large elongations when tested, and for other advantages.

Symmetrical of an aperture 18, when formed in the platform 15, when the beam is above the platform, is a pair of rigid parallel depending rods 20 and 21 extending toward the base out of axial intersecting alignment with the legs 11 and 12, comprising a free-ended probe A, which also forms the fixed anchor for the mounted specimen, to be described.

The beam 16 is a rigid cantilever element having parallel spaced side walls 25 and 26 with intermediate cross connections, 27, and including terminal end cross elements 27' and 27" forming mounts for various elements to be described. The beam is preferably provided with knife edges for antifrictionally pivotally mounting of the beam, on agate bearings on yoke 17, and for anti-frictionally pivotally mounting devices suspended from the beam on agate bearings on supporting yokes. The knife edges are provided in horizontally aligned pairs on respectively opposite sides of the beams and comprise downwardly directed pivots 30 in the center, and upwardly directed pivots 31 and 32 at opposite ends of the beam.

A pedestal yoke 17 is mounted on the platform 15, and journals the beam on its central pivots 30. As shown in FIGURE 1, etc., the beam is pivotally supported below the platform on the pedestal yoke 17, whereas by mere inversion the pedestal yoke 17 pivotally supports the beam on a pivot above the platform. For certain purposes, as has been explained, this may be preferred.

Pivotally supported in suspension from the pivot 31 on the beam is the yoke-mounted basic upper grip member 34, having a threaded lower extension 35, to which various actual grip members or adapters are removably connected. This will become more clear when the actual specimen mounts and their attachments are described hereinafter. The grip member 34 and extension 35 has a vertical axis which is parallel to the probe members 20 and 21, in symmetrical spacing from each. The probe A terminates at the lower end of rods 20 and 21, generally above the level of the base 10. A clamp member 33 is adjustably positioned on the rods 20 and 21 of the probe A and centrally mounts the upwardly extending basic grip element 36 having the threaded extension 37. Grip element 36 has an axis coincident with that of the upper complemental basic grip element 34 and comprises the lowermost anchor of the test specimen toward the lower end of the probe A.

Pivotally supported on the knife edge axis 32 in suspension is a yoke-mounted support 40 to which is disconnectibly connected a weigh pan 41. Weights, not shown, are placed on and taken from the pan 41 during the operation of the apparatus, as will be clear.

In mounting a test specimen for elongation under stress of weight in the pan 41 it is desired to provide mounts of such simplicity and low cost and quantity that disassembly of the specimen from the apparatus can be accomplished with great speed and facility, without wasting time separating a specimen from its immediate mounts. This permits the given mounts to be discarded with the tested specimen. Another factor in this procedure is to provide mounts which are selectively adapted to engage or be engaged by particular forms of specimens. Foils require a flat surface, some whiskers require a tubular form of mount, some require welding or soldering, and some merely a good adhesive, such for purely illustrative instance as an epoxy resin. A main feature of all of the mounts is that the center line of strain through the specimen is in line with the axis of the basic grips.

An illustrative form of grip adapter and specimen mount usable with both the upper and lower grip elements, is shown in FIGURE 19 in assembly, and in component form in FIGURES 16 and 17, and 18 and 20. In this illustration the specimen is filamentous or threadlike. The mount or grip socket comprises a tubular shank 44 merging at one end into a spherically formed flange 45, and cut away laterally and axially toward the other end as to facilitate axial insertion of the instant specimen. After insertion the terminal end of the specimen is anchored against the inner surface of the flange by a drop of solder or resin, or the like. To receive and support the specimen-engaged mount, 44, an adapter grip is provided comprising an internally threaded housing 46 for screwed attachment to the threaded extension 35 or 37, terminating in an internal sloping or tapered shoulder 47. The housing has a lateral key-hole aperture 48, of such large width as to laterally receive flange 45 and of such narrow width as to receive the shank 44. This centers and supports the specimen-engaging mount on the flange 47 and retains same against axial stress, while permitting instant lateral removal after the stress has been relieved.

It will be understood that any number of supplemental adaptors or extensors 39 may be used between the instant grip element 34 and the mount-supporting housing 46, or 49, (to be described) regardless of the form thereof, according to the length of the instant specimen to be tested.

According to a modification of the invention comporting with alternative forms or materials of test specimens, the mount-support element 49, as shown in FIGURES 21 and 22, is provided with internally threaded shank 50 for engagement with the threaded element 35, and merges axially into a shank terminus 51 having a diametric slot 52 extending axially from the free end of the solid shank. A diametrically extending pin 53 is fixed in the shank passing centrally across the slot 52.

A first form of hook-mount for the element shown in FIGURES 21 and 22 is shown in FIGURE 23. According to this latter an open sided generally arcuate hook 55 of internal diameter greater than the diameter of the pin 53, merges into a half-round shank 56 divergent from the hook and having a flat surface 57 toward the open side of the hook. The plane of the flat surface 57 intersects the axis of generation of the hook, or the point of engagement of the hook and the supporting pin. The hook is adapted to pass through the slot 52 and to engage over the pin 53 so that in suspension the planar surface is in line with the contact of the inner surface of the hook with the pin. The flat surface is adapted to receive a whisker or like specimen of narrow width cemented or otherwise mounted thereto.

A modification of the hook device of FIGURE 23 having similar attributes is shown in FIGURE 24. In this form of the invention the hook 55' merges into the shank 56' and the latter is shaped, as by milling or the like to form a longitudinal surface groove 57', the inward center of which in extension intersects the axis of generation of the hook 55'.

It will be apparent that the three forms of mounts just described are primarily effective with specimens of substantially uniform narrow lateral dimensions, such as filaments and whiskers and the like. As an important branch of micro-specimens comprises foils and the like of non-uniform or differential lateral dimensions, reference may be made to FIGURES 25 and 26, as usable with the same sort of support as shown in FIGURES 21 and 22, i.e., a slotted member having a cross pin, or otherwise mounting a horizontal support element, similar to a cross pin.

Referring to these figures (25 and 26), by milling, drilling and countersinking, or like procedures, a metal blank 59 is formed into a suspension mount having at one end a head 60 having a transverse aperture 61 defined by internal champfers or inclined shoulders 62—62 defining a general internal knife edge about a transverse axis of generation. Portions of the head are removed by a tapering cut leading from the outer edge into the aperture 61 at an appreciable angle to the longtiudinal axis of the blank passing through said axis of generation so as to define a hook portion 63. Portions of the blank beside the head are removed to form a planar face 64. The plane of the face 64 passes through the axis of generation of the aperture 61 and bisects the knife edge between shoulders 62—62. When a foil specimen is to be creep-tested, it is cemented to the planar face 64 from which it extends in a plane coincident with the axis of generation of the hook portion and also coincident with the knife edge of said aperture. When hooked over the pin the load is transmitted through the knife edge from the pin, and without loss is transmitted longitudinally to the attached specimen.

In each case above the description has pertained particularly to the upper end of the test specimen, which may be described as the free end thereof, but it is pointed out that identical means are used at the lower anchored end of the specimen positioned at the lower end of the probe.

In practically every case, by the means disclosed, it is cheaper and quicker to remove the specimens and the attached hooked mounts from the apparatus, than to endeavor to separate the specimens from the mounts in order to re-use the latter. This is facilitated by the extreme economy of the mounts as just described.

Referring again to the beam 16 in FIGURES 2, 4 and 5, lock weights 70 are or may be provided for minute adjustments to establish static balance of the beam, as is common with weighers. Additionally in the simplest form the beam mounts a guide rod 71, parallel to the beam, on which a weight 72 is manually adjustable longitudinally of the rod. This is a tare weight to balance the beam after the initial set-up of the specimen and prior to placement of the starting weight or lead.

A more sophisticated tare-weight control is shown in FIGURE 10 and related figures. This arrangement provides minimum disturbance to test set-up when making tare compensation and reflects a constant strain configuration, in which the instant specimen has constant but restricted elongation. This is in contrast to the constant load configuration in which the instant specimen has substantially unrestricted elongation, to be described, although both systems use the same basic instrument frame.

Referring to FIGURE 10, the beam 16 mounts frame members 75 and 76 on which guide rod 71' is mounted, and on which is journalled threaded feed screw 77, parallel to the guide rod on one side of the beam. The weight 72' is threaded on the feed screw and is slidable on the guide rod. The guide rod and feed screw are parallel to the beam 16, and axis 30 is diametrical of both the rod and the screw. On the other side of the beam a servo motor 79 is mounted by suitable brackets 78—78 in symmetry with the beam axis 30, having a driven shaft 80, journalled by the motor and by frame member 75 in parallelism with the beam. By a suitable train of shafting and gears 81, servo motor 79, when actuated, drives the feed screw and positions the weight longitudinally of the beam. Limit switches 82—82 are mounted on the respective frame members 75 and 76 which when engaged by the weight disrupt the circuit to the servo motor 79.

It will be seen that the servo motor has very slight tilting with the beam relative to the transverse beam axis and ordinary flexible lead connectors may extend to the motor, as is common with this type of device. However, dangling wires are undesirable. It is preferred to use the device diagrammatically shown at the left in FIGURE 12. With this organization four mutually insulated aligned mercury wells C, are fixedly supported below the motor, each respectively in electrical contact with respective primary electrical leads D for the motor 79. Fixedly mounted on the motor are secondary electrical leads E for the motor extending rigidly from the motor to immersion respectively in the mercury of the respective wells. Slight motions of the secondary leads with the motor as it may tilt maintains electrical connection between the primary electrical leads and the motor.

With this form of the invention, the set-up of the test specimen on the grips is established before weight is applied to the pan 41. By means of a separate circuit controller, not shown but conventional with transducer networks, the motor 79 is energized in the proper direction to establish tare compensation, and reestablish null balance of the transducer 97. With application of weight to pan 41 the strain on the specimen begins and produces an elongation of the specimen, accompanied by movement of the transducer from null to production of a signal. In addition to actuating signal responsive devices in a network, it also places a voltage on the servo motor 79 driving the feed screw 77 and progressing the weight 72' toward the pan 41, adding to the weight on the pan side of the central pivot. Continuation of elongation of the specimen finds the weight progressively added, to continue the progressive constant elongation of the test specimen. This is a means for gradually effectively increasing the weight functionally with creep of the specimen.

This device may also be used where it is desired to maintain a fixed elongation. A weight is placed on pan 41 so that a predetermined elongation in the test specimen is achieved. The system is then null balanced. After passage of some interval of time the specimen will elongate to some value greater than the predetermined value. However, the displacement is sensed by transducer 97 and the signal therefrom is fed to the servo motor 79, via an appropriate intermediate signal conditioner. The servo motor will cause the weight 72' to move away from pan 41, thereby decreasing the effective load on the test specimen. The servo motor continues moving weight until the original value of elongation is restored and maintained.

The foregoing is in contrast to the basic framework organization as shown in FIG. 1, etc., in which elongation of the specimen reaches a balance with the applied weight, and the operator adds another weight component to further elongate the specimen, so that the elongation is discontinuous but progressive.

In certain cases the amount of creep for a given strain may be excessive, introducing errors by excessive beam movement, requiring a configuration in which account is taken of constant load and unrestricted elongation. For this purpose the system shown in FIG. 15, may be used.

According to this phase of the invention, a stationary platform 15' is provided having the same mounting and the same general attachments as platform 15 of the earlier figures. At a generally central location the platform mounts a vertical housing 85 comprising a ball nut lower enclosure 86 and an upper wider chamber 87 closed at the upper side by a transverse cover plate 88 having a guide enlargement or boss 90 apertured by a vertical bore 91 having a keyway or slot 92. A ball nut 93 is rotatable in the enclosure 86 and is driven in rotation by a worm wheel 94 in the chamber 87. A servo motor 79' drives a worm gear 99 which is in mesh with the worm wheel 94. An elongated shaft 95 has an upper cylindrical portion 96, having a longitudinal keyway or slot 197 and is slidably guided in the boss 90, and at the lower end is formed as a ball screw 198 in mesh with the ball nut 93 in the enclosure 86. A key 100' in the respective keyways 92 and 197 prevents the shaft from rotating while permitting free axial movement of the shaft in response to actuation of the worm 199. At the upper end the shaft rigidly mounts a horizontal sub-platform 15'' and also rigidly mounts a pedestal yoke 17', to which the beam 16 is pivotally connected. The component parts of a transducer 97' are respectively mounted on the sub-platform 15'' and on the beam 16. Preferably this comprises a null sensing differential transformer. Although shown diagrammatically as on the end of the beam adjacent to the weight platform or pan, it is actually normal to axis 32, just as such location with the axis 31 is the actual preferred disposition of the other transducers so far described. Such location gives a 1:1 ratio and avoids the necessity for calibrating for the distance from such axis to the off-set transducer. At any rate the output of differential transformer 97' controls the operation of servo motor 79'.

To sense and signal the elongation of the specimen, the coil portion 102 of a long travel differential transformer 101 is mounted vertically on the stationary platform 15' and the armature 103 thereof is rigidly mounted vertically on a transverse frame member 104 affixed to the lower end of the ball screw portion of the shaft 95.

At the beginning of the test the worm is rotated by the servo motor in the proper direction to bring the shaft 95 to its lowermost setting, and, of course, bringing the sub-platform and beam together to their lowermost setting. This moves the armature 103 of the transducer 101 to the lower end of the coil unit 102 signalling substantially no elongation. The test specimen is mounted on the appropriate grips passing through the sub-platform 15'' and anchored at the lower end to the probe depending from the stationary platform as in the other forms of the invention.

Upon set-up the tare weight is adjusted to bring the beam 16 into its horizontal attitude at which the differential transformer 97' has a substantially null output. At this point a weight is placed on the weight pan 41. Instantaneously the weight is balanced by the tension on the specimen, but as the specimen begins to elongate this balance is upset and the beam starts to tilt downwardly developing a signal from transducer 97' functional with the elongation of the specimen. This signal is immediately effective on servo motor 79' which elevates the shaft 95 and thus the beam 16, thus increasing the tension on the specimen in opposition to the applied weight and substantially neutralizing the signal from the transducer 97'. This operation is continuously repeated so as to effect a substantially continuous elongation and a continuously increasing signal from transformer 97'.

The important function of the beam is to tilt under the creep of the specimen under test and for smoothness it is preferred to mount an aluminum vane 106 on the beam disposed between the poles of a permanent magnet 107, comprising together a magnetic damper. It is of course important that a read-out of the elongation be constantly shown or known. The read-out may be visual, as by a pointer and scale 99, or by lightbeams amplifying a vernier scale. Preferably an electrical signal is used, in lieu of or in supplement of visual signals.

For electrical signaling one or more transducers 97', is provided having a stationary component and a movable component. Illustratively the transducer comprises a null balance linear differential transformer, comprising coils 98 and an armature 100. Preferably the transformer is one that moves from null to a maximum output in either sense by an armature relative movement.

The relative movement of the armature and coils functional with creep of the specimen generates a usable signal which can be read-out by suitable meters such as a D'Arsonval meter or the like and other network devices. The signal can be fed to actuate a recorder or the like, or for visual observation, and also, when desired, can be used to actuate a prime mover for desired mechanical effects.

Mention has been made of the environmental control. This is typified by the cylindrical container B of FIGURES 1 and 7. Although illustrated as a hollow, open-ended can or the like into which the probe A can be relatively inserted, this may take any form and be of any section or length as to receive the probe and enclose the specimen under test. The container B may comprise a flask, a bath, a furnace, or a cryogenic entity.

The housing formed by element B may be such as to bathe the specimen in any desired gas, liquids or various extremes of heat or various extremes of cold. In the normal course the upper end of B is closed by a sealing combination of elements carried respectively by the container B and the open end of the container.

I claim as my invention:
1. Micro creep-testing apparatus comprising
   a support,
   a probe mounted on the support and having a free end spaced from the support,
   means for temporarily anchoring a micro test specimen at one end on said probe spaced from the support,
   a balance beam on said support,
   means for temporarily securing the free end of such test specimen to said balance beam in spaced aligned relation to the means anchoring the test specimen, a load weight urging said balance beam toward movement stressing such test specimen, a transducer between the beam and support signalling deflection of said beam, and means responsive to the signal from said transducer for relatively shifting the position of said beam and support.

2. Apparatus as in claim 1 in which the means responsive to the signal from said transducer also shifts the relative position of a transducer component relative to said support.

References Cited

UNITED STATES PATENTS 2,612,415   9/1952   Williams _____ 308—2

FOREIGN PATENTS 824,267   7/1949   Germany.

OTHER REFERENCES

Marsh, D. M.: Journal of Scientific Instruments, vol. 38, June 1961, pp. 229–234.

Sinclair, D. I.: Journal of Applied Physics, vol. 21, May 1950.

Norton, J. T.: Instruments, vol. 21, p. 328.

Sinclair, D. II.: The Review of Scientific Instruments, vol. 27, January 1956, pp. 34–36.

RICHARD C. QUEISSER, *Primary Examiner.*

J. H. WILLIAMSON, *Assistant Examiner.*